US005481110A

United States Patent [19]

Krishnaswamy et al.

[11] Patent Number: 5,481,110

[45] Date of Patent: Jan. 2, 1996

[54] THIN FILM PRECONCENTRATOR ARRAY

[75] Inventors: Silaipillayarputhur V. Krishnaswamy, Monroeville; Carl B. Freidhoff, Murrysville, both of Pa.

[73] Assignee: Westinghouse Electric Corp, Baltimore, Md.

[21] Appl. No.: 320,468

[22] Filed: Oct. 7, 1994

Related U.S. Application Data

[63] Continuation-in-part of Ser. No. 124,873, Sep. 22, 1993, Pat. No. 5,386,115.

[51] Int. Cl.[6] .............................. B01D 59/44; H01J 49/00

[52] U.S. Cl. .............................................. 250/288; 250/281

[58] Field of Search ...................................... 250/281, 288, 250/427

[56] References Cited

U.S. PATENT DOCUMENTS

| | | | |
|---|---|---|---|
| 4,759,210 | 7/1988 | Wohltjen | 73/23 |
| 4,839,143 | 6/1989 | Vora et al. | 250/286 |
| 4,987,767 | 1/1991 | Corrigan et al. | 73/23.36 |
| 5,083,019 | 1/1992 | Spangler | 250/287 |
| 5,109,691 | 5/1992 | Corrigan et al. | 73/23.36 |
| 5,345,809 | 9/1994 | Corrigan et al. | 73/23.2 |
| 5,386,115 | 1/1995 | Freidhoff et al. | 250/281 |

OTHER PUBLICATIONS

J. W. Grate et al., "Solubility Interactions And The Design of Chemically Selective Sorben Coatings For Chemical Sensors And Arrays", 3 *Sensors & Actuators B* 85 (1991).

W. H. King, "Piezoelectric Sorpiton Detector", 36 *Anal. Chem.*, 1735 (1964).

J. L. Cheney and J. B. Homolya, "A Systematic Approach For The Evaluation OF Triethanolamine As A Possible Sulfur Dioxide Soption Detector Coating", 75 *Anal. Letts.* 75 (1975).

K. H. Karmarkar et al., "The Detection Of Ammonia And Nitrogen Dioxide At The Parts Per Billion Level With Coated Piezoelectric Crystal Detectors", 75 *Anal. Chim. Acta* 111 (1975).

J. Hlavay et al., "Detection of Ammonia In Ambient Air With Coated PIezoelectric Crystal Detector", 50 *Anal. Chem.* 1044 (1978).

M. S. Nieuwenhuizen et al., "Processes Involved At The Chemical Interface of a SAW Chemosensor", 11 *Sensors and Actuators* 45 (1987).

G. G. Guilbault et al., "A Coated Piezoelectric Crystal To Detect Organophosphorous Compounds And Pesticides", 2 *Sensors and Actuators* 43 (1981/82).

Y. Tomita et al., "Detection of Explosives With A Coated Piezoelectric Quartz Crystal", 51 Anal. Chem. 1475 (1979).

A/ Snow et al., "Poly(ethylene maleate)—Cyclopentadiene; A Model Reactive Polymer–Vapor System For Evaluation of a SAW Microsensor", 56 Anal. Chem. (1979).

J. W. Grate et al., "A Smart Sensor System Utilizing A surface Acoustic Wave Vapor Sensor Array and Pattern Recognition For Selective Trace Organic Vapor Detection: PartI", NRL Memorandum Report No. 1916 (1991).

S. Hoshinouchi et al., "Fabrication Of A Fine Heating (List continued on next page.)

*Primary Examiner*—Bruce C. Anderson
*Attorney, Agent, or Firm*—C. O. Edwards

[57] ABSTRACT

A preconcentrator is provided for use in a solid state mass spectrograph for analyzing a sample gas. The mass spectrograph is formed from a semiconductor substrate and has a cavity with an inlet, a gas ionizing section adjacent the inlet, a mass filter section adjacent the gas ionizing section and a detector section adjacent the mass filter section. The preconcentrator is provided in the mass spectrograph between the inlet and gas ionizing section. The preconcentrator includes an array of preconcentrating elements, each of which is built upon a semiconductor substrate upon which a dielectric membrane has been deposited. An absorber is provided on the membrane for collecting and concentrating the gas to be sampled. Heater means provided on the membrane releases the absorbed sample gas from the absorber.

16 Claims, 4 Drawing Sheets

OTHER PUBLICATIONS

Element For Microelectronics", *2nd Int. Conf. on Vac. Microeectron., Bath*, p. 13 (1989.
P. Hille et al., "A Heated Membrane For A Capacitive Gas Sensor" 32 *Sensors and Actuators A* 321 (1989).
K. D. Schierbaum et al., "Prototype Structure For Systematic Investigations Of Thin–film Gas Sensors" 1 *Sensors and Actuators B* 171 (1990.

THIN FILM PRECONCENTRATOR ARRAY

GOVERNMENT CONTRACT

The government of the United States of America has rights in this invention pursuant to Contract No. 92-F-141500-000, awarded by the United States Department of Defense, Defense Advanced Research Projects Agency.

CONTINUING APPLICATION

This application is a continuation-in-part of Application Ser. No. 08/124,873, filed Sep. 22, 1993, U.S. Pat. No. 5,386,115.

BACKGROUND OF THE INVENTION

1. Field of the Invention

This invention relates to a gas-detection sensor and more particularly to a solid state mass spectrograph which is micro-machined on a semiconductor substrate, and, even more particularly, to a preconcentrator array for concentrating the gas to be sampled by the mass spectrograph.

2. Description of the Prior Art

Various devices are currently available for determining the quantity and type of molecules present in a gas sample. One such device is the mass-spectrometer.

Mass-spectrometers determine the quantity and type of molecules present in a gas sample by measuring their masses. This is accomplished by ionizing a small sample and then using electric and/or magnetic fields to find a charge-to-mass ratio of the ion. Current mass-spectrometers are bulky, bench-top sized instruments. These mass-spectrometers are heavy (100 pounds) and expensive. Their big advantage is that they can be used in any environment.

Another device used to determine the quantity and type of molecules present in a gas sample is a chemical sensor. These can be purchased for a low cost, but these sensors must be calibrated to work in a specific environment and are sensitive to a limited number of chemicals. Therefore, multiple sensors are needed in complex environments.

A need exists for a low-cost gas detection sensor that will work in any environment. U.S. patent application Ser. No. 08/124,873, filed Sep. 22, 1993, hereby incorporated by reference, discloses a solid state mass-spectrograph which can be implemented on a semiconductor substrate. FIG. 1 illustrates a functional diagram of such a mass-spectrograph 1. This mass-spectrograph 1 is capable of simultaneously detecting a plurality of constituents in a sample gas. This sample gas enters the spectrograph 1 through dust filter 3 which keeps particulate from clogging the gas sampling path. This sample gas then moves through a sample orifice 5 to a gas ionizer 7 where it is ionized by electron bombardment, energetic particles from nuclear decays, or in a radio frequency induced plasma. Ion optics 9 accelerate and focus the ions through a mass filter 11. The mass filter 11 applies a strong electromagnetic field to the ion beam. Mass filters which utilize primarily magnetic fields appear to be best suited for the miniature mass-spectrograph since the required magnetic field of about 1 Tesla (10,000 gauss) is easily achieved in a compact, permanent magnet design. Ions of the sample gas that are accelerated to the same energy will describe circular paths when exposed in the mass-filter 11 to a homogenous magnetic field perpendicular to the ion's direction of travel. The radius of the arc of the path is dependent upon the ion's mass-to-charge ratio. The mass-filter 11 is preferably a Wien filter in which crossed electrostatic and magnetic fields produce a constant velocity-filtered ion beam 13 in which the ions are disbursed according to their mass/charge ratio in a dispersion plane which is in the plane of FIG. 1.

A vacuum pump 15 creates a vacuum in the mass-filter 11 to provide a collision-free environment for the ions. This vacuum is needed in order to prevent error in the ion's trajectories due to these collisions.

The mass-filtered ion beam is collected in a ion detector 17. Preferably, the ion detector 17 is a linear array of detector elements which makes possible the simultaneous detection of a plurality of the constituents of the sample gas. A microprocessor 19 analyses the detector output to determine the chemical makeup of the sampled gas using well-known algorithms which relate the velocity of the ions and their mass. The results of the analysis generated by the microprocessor 19 are provided to an output device 21 which can comprise an alarm, a local display, a transmitter and/or data storage. The display can take the form shown at 21 in FIG. 1 in which the constituents of the sample gas are identified by the lines measured in atomic mass units (AMU).

Preferably, mass-spectrograph 1 is implemented in a semiconductor chip 23 as illustrated in FIG. 2. In the preferred spectrograph 1, chip 23 is about 20 mm long, 10 mm wide and 0.8 mm thick. Chip 23 comprises a substrate of semiconductor material formed in two halves *25a* and *25b* which are joined along longitudinally extending parting surfaces *27a* and *27b*. The two substrate halves *25a* and *25b* form at their parting surfaces *27a* and *27b* an elongated cavity 29. This cavity 29 has an inlet section 31, a gas ionizing section 33, a mass filter section 35, and a detector section 37. A number of partitions 39 formed in the substrate extend across the cavity 29 forming chambers 41. These chambers 41 are interconnected by aligned apertures 43 in the partitions 39 in the half *25a* which define the path of the gas through the cavity 29. Vacuum pump 15 is connected to each of the chambers 41 through lateral passages 45 formed in the confronting surfaces *27a* and *27b*. This arrangement provides differential pumping of the chambers 41 and makes it possible to achieve the pressures required in the mass filter and detector sections with a miniature vacuum pump.

Because of its size and power requirements, a micro-miniature mass-spectrograph 1 is already attractive as an integrated gas sensor. The detection sensitivity of such a device is projected to be limited to 0.1 parts per million (ppm). Many applications, from breath analyzing in the medical field to gas monitoring of the environment, require sensitivity in the parts per billion (ppb) range. This requires improving the sensitivity of the mass-spectrograph 1 without slowing down measurement speed or accuracy. The preferred integration time for a mass-spectrograph 1 is currently approximately 100 mseconds per window, translating to a total of approximately 2 seconds for scanning a mass range extending from 1 to 650 amu.

Improving sensitivity by a factor of 100 can be achieved by adding a chemical separator or preconcentrator as an input stage to the mass-spectrograph 1. However, preconcentrator absorption and desorption time should be kept to a minimum (ideally 2 seconds or less) for measurement timeliness. Furthermore, size and power must be minimized to maintain a high degree of portability.

Gas chromatographs can act as chemical separators. A gas sample is transported through a capillary tube via a carrier gas such as helium. Selective adsorption/desorption along the length of the tube results in separation of the gas sample's constituents. Detection is accomplished at the end of the tube as each constituent passes by, usually by measuring the gas's thermal conductivity. Gas chromatographs have been reduced in size to 3" diameter by ¾" thick using micro-machining or micro-capillary technology. While the micro-machined or micro-capillary gas chromatograph is an attractive candidate for use with current mass-spectrometers, it is too large compared with micro-miniature mass-spectrographs (1 sq. in×0.030") and requires 5 to 8 watts for operation.

Preconcentrators have been used with surface acoustic wave chemical sensor arrays. Such preconcentrators consist of a 1.5" long glass tube with a ⅛" inner diameter packed with approximately ½ of 40–60 mesh Tenax. Such preconcentrators sorb in one direction and desorb in the other. A nichrome wire and thermistor are attached outside of the glass tube and are used to heat the preconcentrators to 200 degrees C during desorb. The current thermal desorbers used for preconcentration are large, cumbersome and require several watts.

The issue of input stage size and power, particularly for extended field operation, makes these methods of preconcentrators undesirable for a low power, handheld instrument. Accordingly, there is a need for an improved micro-miniature preconcentrator.

SUMMARY OF THE INVENTION

A preconcentrator is provided for use in a solid state mass spectrograph for analyzing a sample gas. The mass spectrograph is formed from a semiconductor substrate and has a cavity with an inlet, a gas ionizing section adjacent the inlet, a mass filter section adjacent the gas ionizing section and a detector section adjacent the mass filter section. The preconcentrator is provided in the mass spectrograph between the inlet and gas ionizing section. The preconcentrator includes an array of preconcentrating elements, each of which is built upon a semiconductor substrate upon which a dielectric membrane has been deposited. An absorber is provided on the membrane for collecting and concentrating the gas to be sampled. Heater means provided on the membrane releases the absorbed sample gas from the absorber.

Using the thin film array preconcentrator, a micro-miniature mass-spectrograph can improve its sensitivity and selectivity at much lower power levels without compromising instrument portability. With this addition, a high performance, battery operated handheld mass-spectrograph instrument becomes realizable.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE PREFERRED EMBODIMENTS

A thin film array of preconcentrators fabricated by micro-machining techniques are provided which enhance detection sensitivity of a micro-miniature mass-spectrograph 1 to the 1 ppb level. The approach use bey such preconcentrators is to absorb selectively a given gas species or a known subset of gas species and release the concentrated amount of this species by selective desorption.

Figure 1:
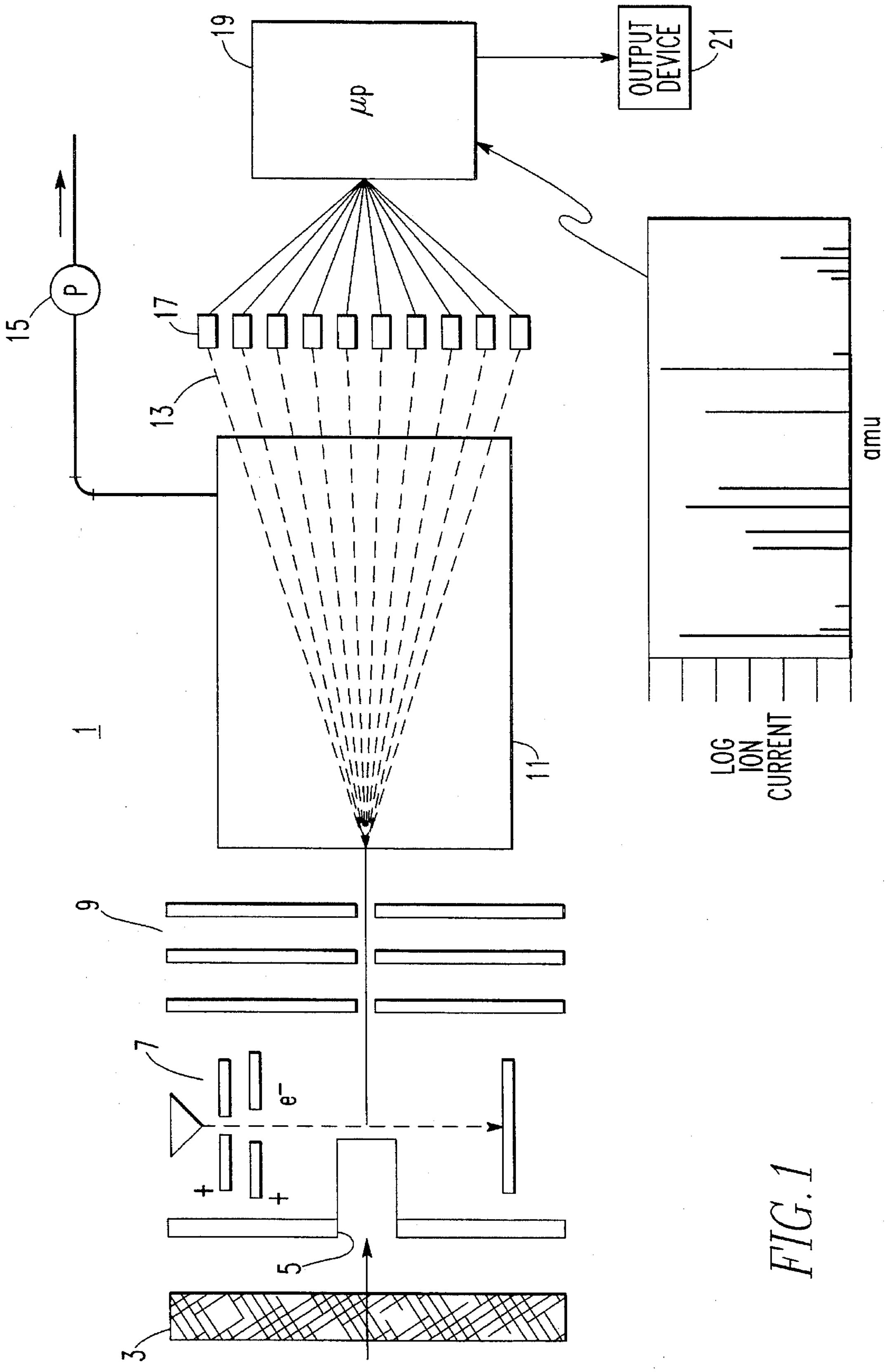
FIG. 1 is a functional diagram of a solid state mass-spectrograph in accordance with the invention.
Figure 2:
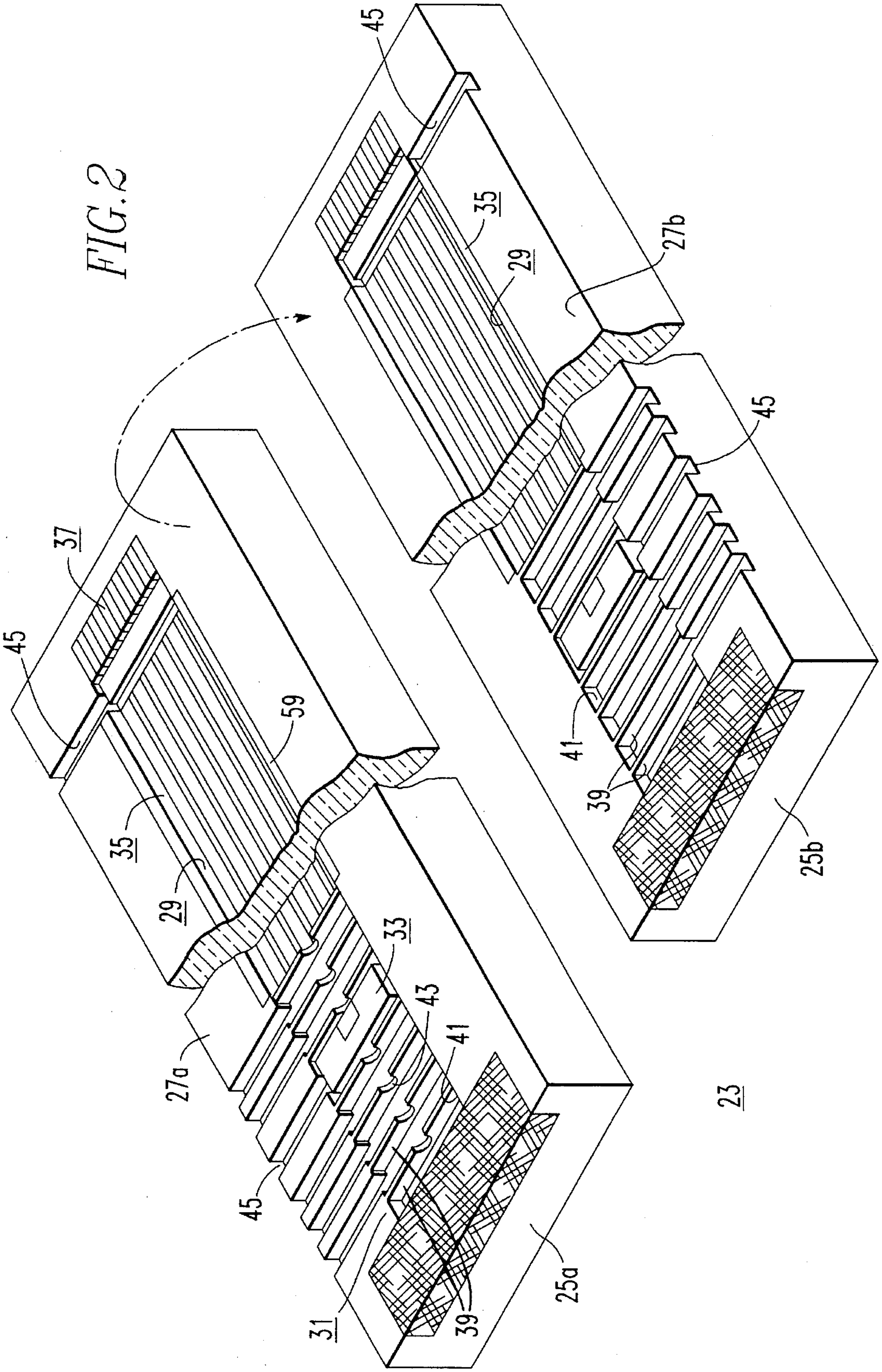
FIG. 2 is a isometric view of the two halves of the mass-spectrograph of the invention shown rotated open to reveal the internal structure.
Figure 3:
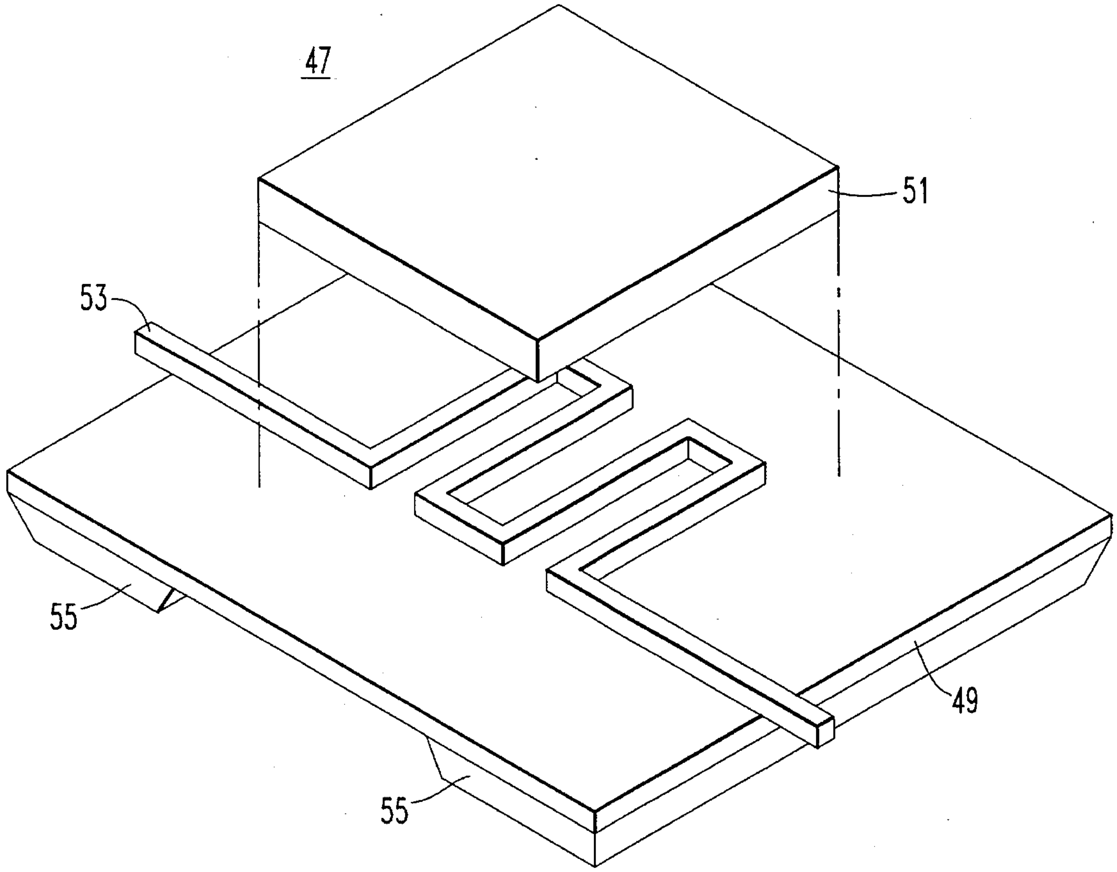
FIG. 3 is a schematic representation of a presently preferred embodiment of the preconcentrator of the present invention.

FIG. 3 shows a thin film array element 47 consisting of three parts: a thin dielectric membrane 49; an absorber coating 51; and a micro-heater 53. The membrane 49 is fabricated by first depositing a dielectric film on a semiconductor substrate 55 and then using micro-machining techniques to remove pre-selected areas under the dielectric layer 49. The thin film micro-heater 53 is fabricated directly on the membrane 49 so that when required each of the array elements 47 can be heated by the corresponding heater 53. The absorber coating 51 is deposited directly on the membrane 49. Each membrane 49 has tailored coatings 51 selected for sorption of different species of gases.

In fabricating thin film array elements 47, either bulk or surface micro-machining techniques can be used. When bulk micro-machining is employed, the silicon substrate 55 can be etched from either the back or top surface. In surface micro-machining, thin film array 47 elements 47 are deposited over sacrificial film which is subsequently removed.

Reported data exists on various absorber coatings 51 and the family of chemicals absorbed by each film. A variety of criteria are used to determine the number and type of coating for each element 47 of the array including: space needed for each thin film array element 47, the power required for operation and the gas species that needs to be released in concentrated amount. Sensitivity and selectivity of the absorber 51 is controlled by tailoring the physical and chemical to properties of coatings 5 to maximize particular solubility interaction. Table I below gives a list representative of coatings that selectively absorb air pollutants, pesticides, organophosphorus compounds, explosives, and nerve and blister agents.

TABLE I

List of Selected Adsorbates and Coatings

| Adsorbate/Absorbate | Coating |
|---|---|
| Air Pollutants | |
| $SO_2$ | Triethanolamine<br>Quadrol |
| NO2 | Pthalocyanine |
| NH3 | L-glutamic acid.HCl<br>Pyridoxine.HCl |
| $H_2S$ | Triethanolamine |
| Organophosphorus Compounds And Pesticides | 3-PAD+Triton X-100+NaOH (PAD= 1-n-dodecyl-3-hydroxymethylpyridinium) |
| Explosives (Mononitrotoluene) | Carbowax 1000 |
| Cyclopentadiene | PEM<br>Poly(ethylene maleate) |
| Nerve Agent | FPOL |
| DMMP [Simulant for GD(Soman)] | (Fluropoyol) |
| Blister Agent | PECH & ECEL |

TABLE I-continued

| List of Selected Adsorbates and Coatings | |
|---|---|
| Adsorbate/Absorbate | Coating |
| HD(Mustard Gas) | [Poly(epichlorohydrin)] & Ethyl Cellulose |

A variety of thin film heaters 53, using various thin film materials, have been used in miniaturized form to serve as constant temperature sources for inter-digital capacitors and measurement of conductivity and impedance. Such micro-heaters can be incorporated in the design of the present thin film preconcentrator array element 47.

The thin film preconcentrator array is preferably placed in the first stage of the mass-spectrograph 1 and would derive a gas flow over the absorbers through the pumps 15 which are incorporated with the mass-spectrograph 1 to provide the operational vacuum. The first stage of mass-spectrograph 1 is the desired location for a number of reasons. First, the maximum gas flow is found in this stage, thereby minimizing the absorption time. Second, the relatively high pressure in this first stage (and therefore highest gas density) for all gas species will be maximized in this stage, thereby improving the overall absorption efficiency (absorbed material per unit time).

In order to increase sensitivity, the first stage pump 15 can be shut down during the desorption cycle to maximize the amount of the desorbed material pulled into subsequent stages of the differentially pumped sensor. Alternately, the array can be incorporated into a separate differentially pumped stage which can be controlled during the desorption phase.

Figure 4:
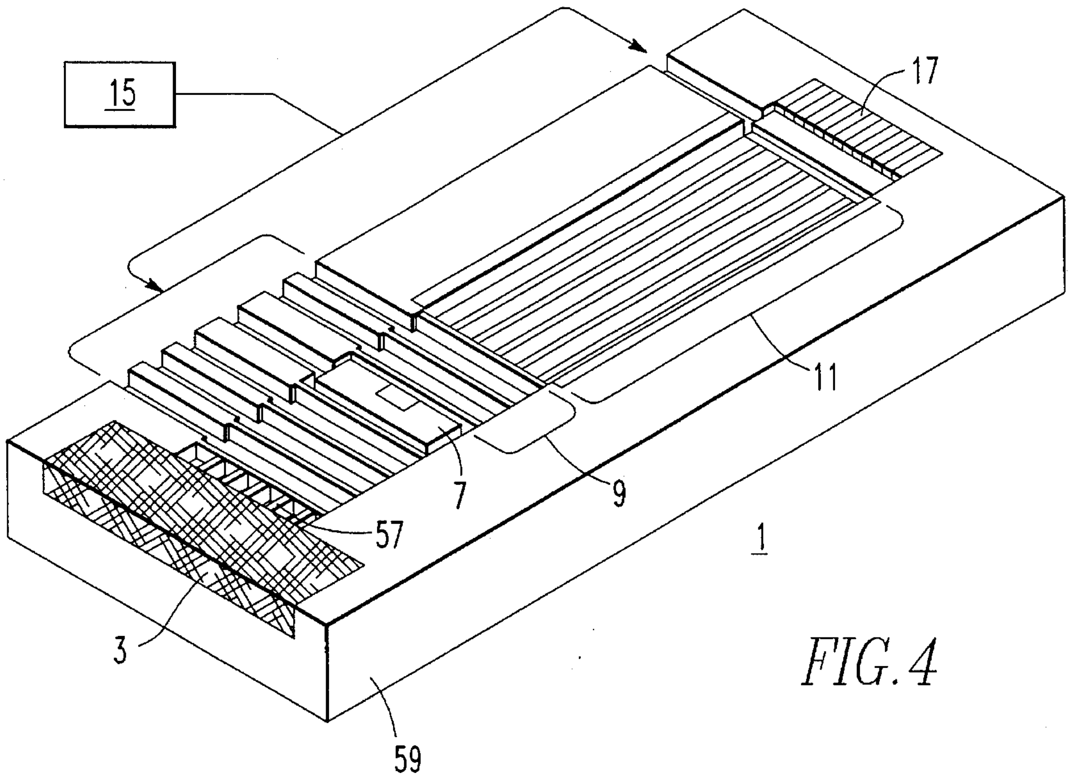
FIG. 4 is an isometric view of a first presently preferred arrangement of the preconcentrator of the present invention provided in a mass-spectrograph.
Figure 5:
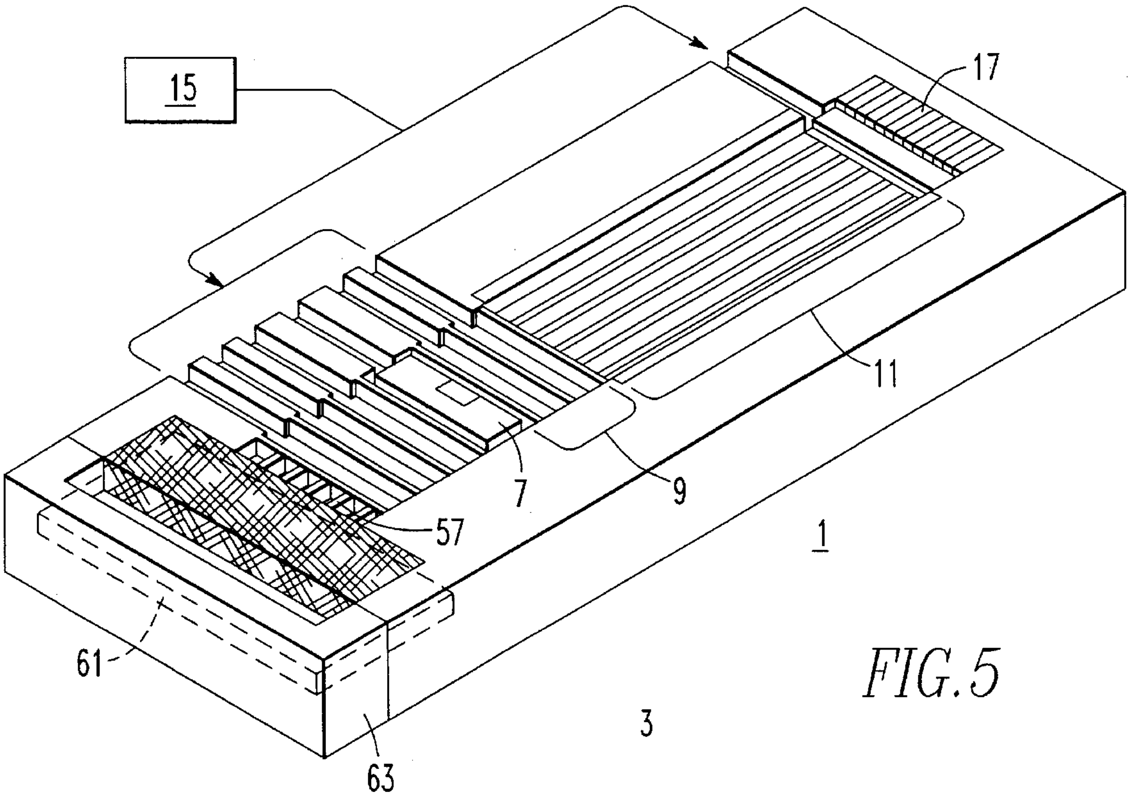
FIG. 5 is an isometric view of a second presently preferred arrangement of the preconcentrator of the present invention provided in a mass-spectrograph.

The thin film preconcentrator array 57 can be incorporated into the mass-spectrograph 1 in two different ways, both of which are compatible with the operation of the gas sensor. One scenario, shown in FIG. 4, has the array 57 fabricated on a common substrate 59 with the mass-spectrograph 1. In this arrangement, the desorbable array 57 is located behind the dust filter 3. A second implementation, as shown in FIG. 5, places the desorbable array 57 on a separate chip 61 which mates to the mass-spectrograph 1 in front of the dust filter 3 and provides a rough filter for the mass-spectrograph 1. A sealing cap 63 secures the array 57 within the mass-spectrograph 1. This arrangement has the advantage of a changeable array 57 for sensing different gases if applications warrant and if the array's lifetime is significantly shorter than that of the overall gas sensor.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims in any and all equivalents thereof.

We claim:

1. A preconcentrator for use in a solid state mass spectrograph for analyzing a sample gas, said mass spectrograph being formed from a semiconductor substrate having a cavity with an inlet, a gas ionizing section adjacent said inlet, a mass filter section adjacent said gas ionizing section and a detector section adjacent said mass filter section, said preconcentrator being provided in said mass spectrograph between said inlet and said gas ionizing section, said preconcentrator comprising a dielectric membrane deposited on a semiconductor substrate, an absorber provided on said membrane for collecting and concentrating said sample gas and heater means provided on said membrane for releasing said absorbed sample gas from said absorber.

2. The preconcentrator of claim 1 wherein said dielectric membrane is formed from one of silicon nitride or silicon oxide.

3. The preconcentrator of claim 1 wherein said heater means is a thin film micro-heater.

4. The preconcentrator of claim 3 wherein said thin film micro-heater is fabricated directly upon said membrane.

5. The preconcentrator of claim 1 wherein said absorber is selected in accordance with the gas to be sensed.

6. The preconcentrator of claim 5 wherein said absorber is applied as a coating upon said membrane.

7. The preconcentrator of claim 1 wherein said preconcentrator is fabricated upon the same substrate as said mass spectrograph.

8. The preconcentrator of claim 1 wherein said preconcentrator is fabricated on a chip separate from said mass spectrograph substrate, said chip adapted to mate with said mass spectrograph.

9. A preconcentrator for use in a solid state mass spectrograph for analyzing a sample gas, said mass spectrograph being formed from a semiconductor substrate having a cavity with an inlet, a gas ionizing section adjacent said inlet, a mass filter section adjacent said gas ionizing section and a detector section adjacent said mass filter section, said preconcentrator being provided in said mass spectrograph between said inlet and said gas ionizing section, said preconcentrator comprising an array of preconcentrating elements, each of said preconcentrator elements having a dielectric membrane deposited on a semiconductor substrate, an absorber provided on said membrane for collecting and concentrating said sample gas and heater means provided on said membrane for releasing said absorbed sample gas from said absorber.

10. The preconcentrator of claim 9 wherein said dielectric membrane is formed from one of silicon nitride or silicon oxide.

11. The preconcentrator of claim 9 wherein said heater means is a thin film micro-heater.

12. The preconcentrator of claim 11 wherein said thin film micro-heater is fabricated directly upon said membrane.

13. The preconcentrator of claim 9 wherein said absorber is selected in accordance with the gas to be sensed.

14. The preconcentrator of claim 13 wherein said absorber is applied as a coating upon said membrane.

15. The preconcentrator of claim 9 wherein said preconcentrator is fabricated upon the same substrate as said mass spectrograph.

16. The preconcentrator of claim 9 wherein said preconcentrator is fabricated on a chip separate from said mass spectrograph substrate, said chip adapted to mate with said mass spectrograph.

* * * * *